United States Patent [19]

Yasuoka

[11] Patent Number: 4,468,070

[45] Date of Patent: Aug. 28, 1984

[54] SWIVELING APPARATUS HAVING INSTALLED ELECTRIC CABLES

[75] Inventor: Hirotoshi Yasuoka, Aichi, Japan

[73] Assignee: Mitsubishi Denki Kabushiki Kaisha, Tokyo, Japan

[21] Appl. No.: 462,866

[22] Filed: Feb. 1, 1983

[30] Foreign Application Priority Data

Feb. 2, 1982 [JP] Japan ............... 57/13145[U]

[51] Int. Cl.³ .............................. H01R 39/00
[52] U.S. Cl. ...................... 339/7; 339/5 M; 339/8 R
[58] Field of Search ............... 339/5, 6, 7, 8

[56] References Cited

U.S. PATENT DOCUMENTS

| 293,735 | 2/1884 | Henderson | 339/5 M |
|---|---|---|---|
| 2,284,384 | 5/1942 | Evans | 339/5 R |
| 2,537,714 | 1/1951 | Spielman | 339/5 R |
| 2,677,777 | 5/1954 | West et al. | 339/5 P |
| 3,032,735 | 5/1962 | Dingman | 339/6 R |
| 3,597,721 | 8/1971 | Mangan | 339/5 R |
| 3,599,165 | 8/1971 | Wendell | 339/5 M |

Primary Examiner—Joseph H. McGlynn
Assistant Examiner—David L. Pirlot
Attorney, Agent, or Firm—Sughrue, Mion, Zinn, Macpeak, and Seas

[57] ABSTRACT

A swiveling apparatus has installed electric cables which electrically interconnect equipment in a factory to equipment which is supported by the apparatus. The apparatus includes a fixed part which contains a cylindrical portion which is engaged via bearings with a rotating portion of a rotating part. A plurality of right-hand wound springs and left-hand wound springs are alternately disposed along a periphery of the cylindrical portion of the fixed part and extend between ribs and a base portion of the fixed part. A plurality of electric cables extend between a connector, which is connected to electric cables of the outside equipment, and the equipment which is supported by the rotating part. The springs are of sufficient length so that the rotating part can be rotated through a predetermined angle.

9 Claims, 8 Drawing Figures 9,10

SWIVELING APPARATUS HAVING INSTALLED ELECTRIC CABLES

BACKGROUND OF THE INVENTION

The present invention relates to a swiveling apparatus for a supporting, multi-joint robot or the like which has installed electric cables.

Ordinarily, a swiveling apparatus comprises a fixed part and a rotating part on which a plurality of devices, such as an electric motor for driving an arm of a robot, a detecting device and the like, are supported. For operating these devices, electric cables are installed between an electric power station of a factory and the fixed part of the swiveling apparatus, and also between the fixed part and the electric motor and the detector which are supported by the rotating part of the apparatus.

SUMMARY OF THE INVENTION

According to the present invention, an entire electric cable assembly often includes as many as 72 cables which are divided into several groups. These groups of cables are alternately inserted into tightly wound, right-hand wound springs and left-hand wound springs which are provided in the apparatus for the purpose of avoiding mutual contact interference between the groups of cables while the robot is in its normal position or in its operating condition. The cables are freely slidable in the springs, the lengths of the springs are selected so that a swiveling movement of the apparatus, in a predetermined range of, for example, from $+150°$ to $-150°$, is permitted, and each spring is fixed at its upper and lower ends. The cables in each spring are firmly held at the upper end of the spring to prevent the cables from being drawn out of the spring, while the remaining part of the cables in the spring, which extend to the connector, are left free without any restriction.

DESCRIPTION OF THE PREFERRED EMBODIMENT

Figure 1:
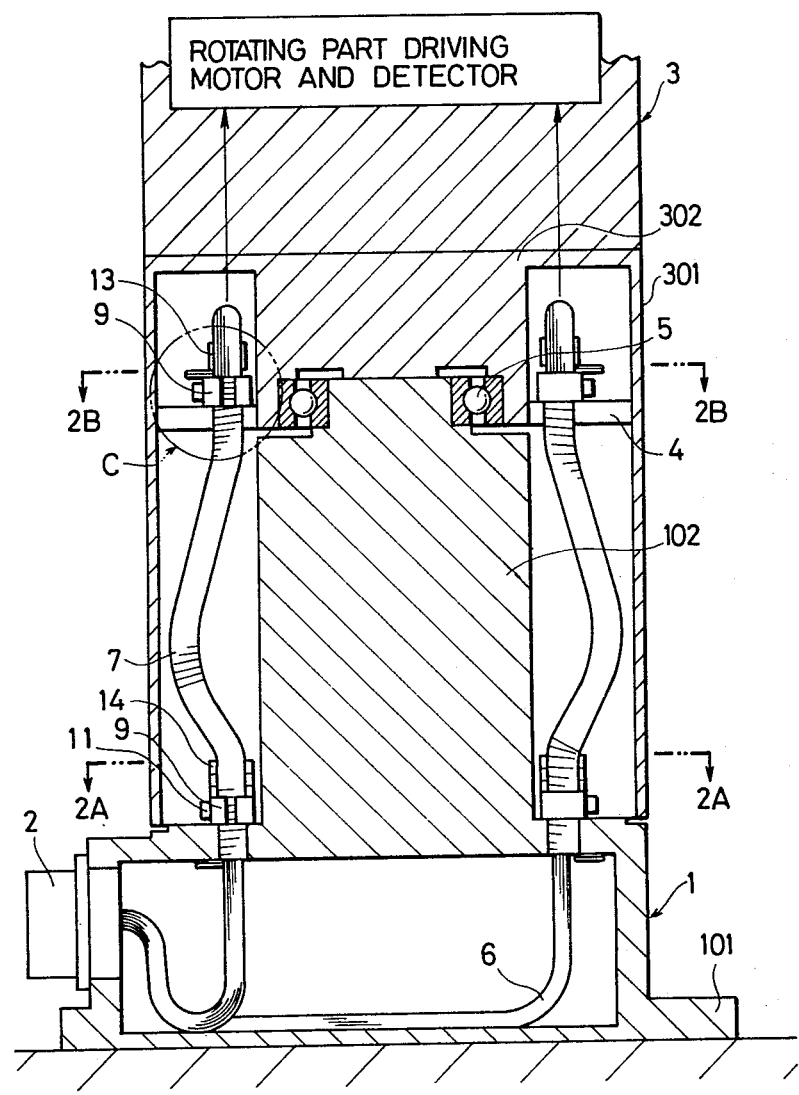
FIG. 1 is a longitudinal, sectional view of one embodiment of the present invention.

A preferred embodiment of the present invention will now be described with reference to FIGS. 1 through 5. In the drawings, a fixed part 1 of the apparatus comprises a base portion 101 which is secured to the floor of a factory and a cylindrical portion 102 which projects from a center of the base portion 101. An electric connector 2 is provided on the cylindrical portion 102 of the fixed part 1, and a rotating part 3 comprises a side wall portion 301 and a rotating portion 302 which supports a driving electric motor and a detector. A plurality of ribs 4 are provided internally at an elevated position of the side wall portion 301 and surround the cylindrical portion 102 of the fixed part 1. A bearing 5 supports the rotating part 3 so that the rotating part 3 is freely rotatable relative to the fixed part 1. Electric cables 6 are provided between the electric connector 2 and the driving electric motor and the detector which are supported by the rotating part 3. Right-hand wound springs 7 encase the cables 6, and several turns at both ends of each spring are set aside to prevent the cables from being damaged by the ends of the springs. Left-hand wound springs 8 are also provided, and the springs 8 are similar to the springs 7 except for their winding direction. The springs 7 and 8 have lengths in the tightly wound state which are sufficient to rotate the rotating part 3 of the apparatus in a predetermined angular range, for example, between $+150°$ and $-150°$, and the springs 7 and 8 are fixed at their upper and lower ends.

Figure 2A:
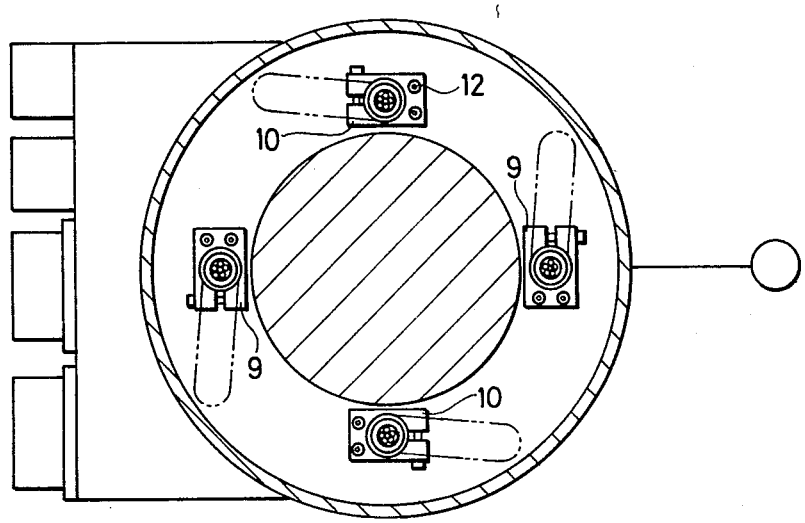
FIGS. 2(A) and 2(B) are sectional views taken from the directions 2A—2A and 2B—2B of FIG. 1.
Figure 2B:
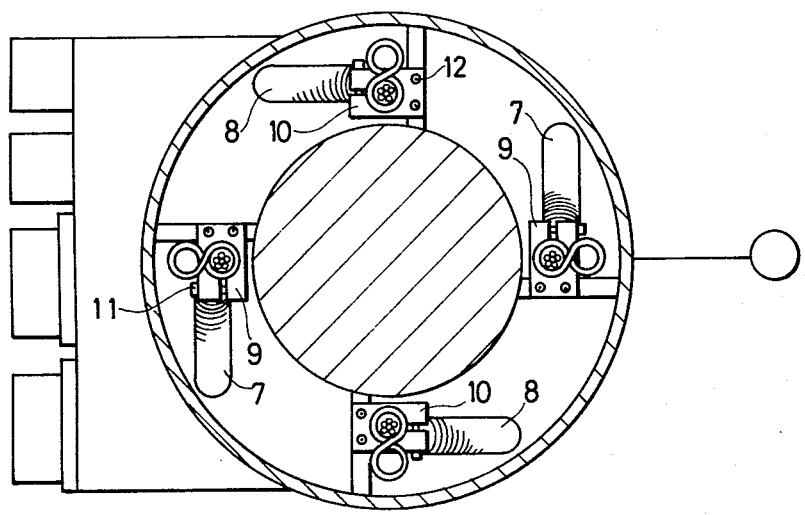

Furthermore, clampers 9 are provided for securing the two ends of the right-hand wound springs 7 to the base portion 101 of the fixed part 1, as well as to the ribs 4. Referring to FIGS. 2A and 2B, each clamper 9 comprises a central part which is provided with a right-hand helical groove which is adapted to receive the right-hand wound spring 7, an end part which is provided with two holes to receive bolts for securing the clamper 9, and another end part which is provided with a cut-off portion for clamping the outer diameter portion at the upper or lower end of the right-hand wound spring 7. Other clampers 10, which are similar to the clampers 9 except for the winding direction of the helical groove, are also provided, and screws 11 are provided to reduce the inner diameter of the central part of the clampers 9 and 10 for clamping the springs 7 and 8. Additional screws 12 are provided for securing the clampers 9 and 10 to the fixed part 1 and the ribs 4 in the rotating part 3, and holding bands 13 are provided in the upper parts of the clampers 9 and 10 to prevent the cables 6 from being draw out of the clampers. Also, spacers 14 are provided around the lower ends of the springs 7 and 8 to avoid the reduction of the radius of curvature of the lower ends due to the weight of the springs 7 and 8 and the electric cables 6.

Figure 3:
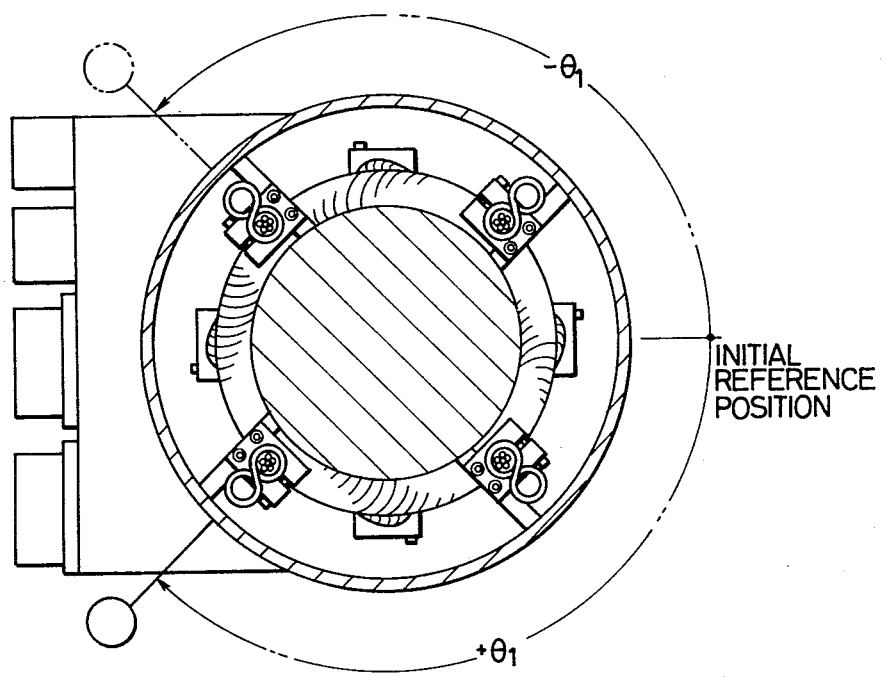
FIG. 3 is a sectional view corresponding to FIG. 2(B) showing a state in which the rotating part is rotated through an angle of $+\theta_1$ from an initial position.
Figure 4:
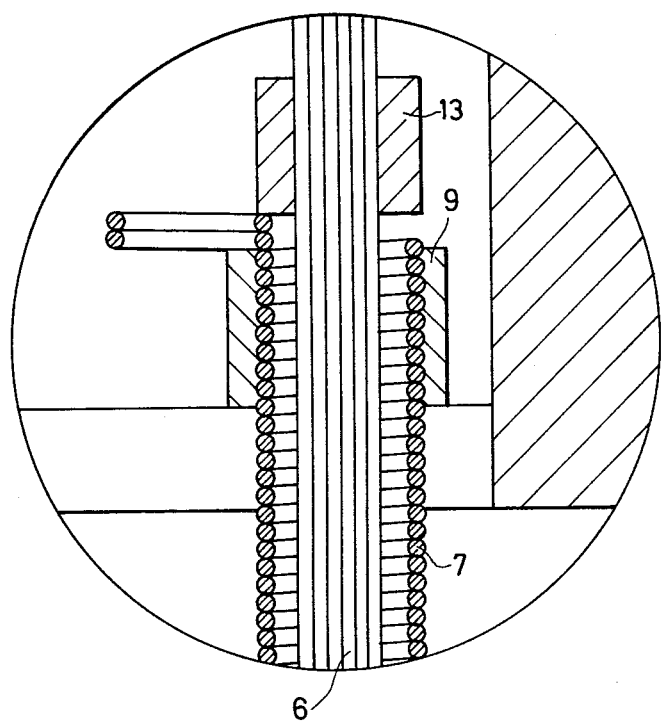
FIG. 4 is a sectional view, on a much enlarged scale, showing the part C of FIG. 1 in detail.
Figure 5A:
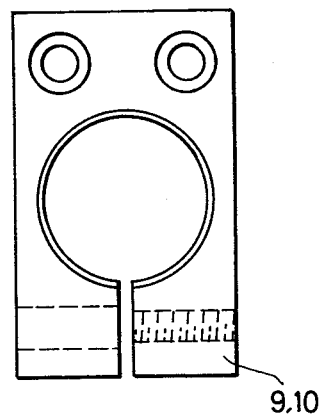
FIGS. 5(A), 5(B) and 5(C) are a front view, side view, and a bottom view of a clamper, respectively.
Figure 5B:
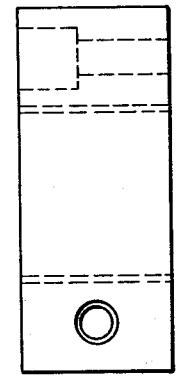
Figure 5C:
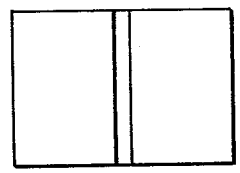

Using the above-described apparatus, when the rotating part 3 is rotated (for instance, at an angle of $+\theta_1$ from the initial position, as shown in FIG. 3), the springs 7 and 8 and the electric cables 6, which are of sufficient lengths so that they extend from their initial position, are wound around the cylindrical portion 102 of the fixed part 1 in accordance with the rotating angle, thereby absorbing the rotating angle while maintaining the cables free from and restricted by the inner diameter portions of the springs 7 and 8.

All types of equipment, such as an electric power source and a numerical control device, can be connected to the connector 2. In addition, equipment, such as a multi-joint robot, a driving electric motor, and a detector, can be supported on the upper part of the rotating part. According to the above-described construction, disconnection trouble and other damage to the cables can be minimized during operations at a predetermined high speed, for example, 0 to 1 m/sec. and at the wide rotating angles (for example, $+150°$ to $-150°$) which are required for the apparatus, and the reliability of the apparatus is substantially improved.

I claim:

1. A swiveling apparatus having installed electric cables (6), comprising:

a fixed part (1) including a base portion (101) secured to a floor and a cylindrical portion (102) having a cross-sectional configuration smaller than that of the base portion, said cylindrical portion projecting upward from a center of the base portion;

an electric connector (2) secured to said base portion of said fixed part for connecting incoming electric cables originating from outside equipment;

a bearing (5) provided at an upper end of said cylindrical portion of said fixed part;

a rotating part (3) for supporting further equipment on an upper part thereof, said rotating part including a rotating portion (302) which is supported rotatably by said bearing, and a side wall portion (301) connected to said rotating portion so as to surround said cylindrical portion with a gap of a predetermined distance maintained between said side wall portion and said cylindrical portion;

a plurality of ribs (4) provided internally of said side wall portion of said rotating part;

right-hand wound springs (7) and left-hand wound springs (8) alternately disposed along a periphery of said cylindrical portion to extend between said ribs and said base portion of said fixed part, said right-hand and left-hand wound springs being of sufficient lengths for rotating said rotating part (3) through a predetermined angle;

a plurality of first clampers (9) for securing said right-hand wound springs to said base portion and said ribs, each of said first clampers (9) having a right-hand helical groove at a central part thereof for receiving said right-hand wound spring and, at an outer part thereof, a clamping portion for clamp-holding an outer diameter part of said right-hand wound spring;

a plurality of second clampers (10) for securing said left-hand wound springs to said base portion and said ribs, each of said second clampers having a left-hand helical groove at a central part thereof adapted for receiving said left-hand wound spring and, at an outer part thereof, a clamping portion for clamp-holding an outer diameter part of said left-hand wound spring; and a plurality of electric cables (6) installed between said connector (2) and said equipment supported by said rotating part so as to pass through an interior of said right-hand wound springs and said left-hand wound springs.

2. The apparatus as claimed in claim 1 wherein said predetermined angle is ranged from +150° to −150°.

3. The apparatus as claimed in claim 1 wherein said rotating portion of said rotating part has a cross-sectional configuration substantially equal to that of said cylindrical portion of said fixed part.

4. The apparatus as claimed in claim 1 further comprising screws (11) which reduce and enlarge an inner diameter part of said first and second clampers for clamping said corresponding springs.

5. The apparatus as claimed in claim 1 further comprising a holding band (13) provided in an upper part of each of said clampers for preventing said installed electric cables from being drawn out of said clampers.

6. The apparatus as claimed in claim 5 further comprising a spacer (14) inserted between each of said clampers and corresponding springs.

7. The apparatus as claimed in claim 6 wherein said right-hand wound springs and said left-hand wound springs are helically wound around said cylindrical portion of said fixed part in accordance with a rotation of said rotating part.

8. The apparatus as claimed in claim 7 wherein said installed electric cables are freely movable without restricting inner diametrical surfaces of said right-hand wound springs and said left-hand wound springs.

9. The apparatus as claimed in claim 8 wherein said outside equipment connected with said connector includes an electric power source and a numerical control device.

* * * * *